United States Patent

Boillot

[11] 3,905,222
[45] Sept. 16, 1975

[54] QUANTITATIVE GAS DETECTION APPARATUS

[75] Inventor: Pierre Boillot, Le Pecq, France

[73] Assignee: Institut de Recherches de la Siderurgie Francaise, St. Germain-en-Laye, France

[22] Filed: Sept. 6, 1973

[21] Appl. No.: 394,687

[30] Foreign Application Priority Data
Sept. 14, 1972   France ............................ 72.32527

[52] U.S. Cl. .................................................. 73/19
[51] Int. Cl.² ........................................... G01N 7/14
[58] Field of Search ............. 73/19, 23, 23.1; 13/25, 13/32; 277/15, 17

[56] References Cited
UNITED STATES PATENTS

| | | | |
|---|---|---|---|
| 2,591,762 | 4/1952 | Zaikowsky | 73/27 R |
| 3,176,500 | 4/1965 | Coe | 73/19 |
| 3,229,500 | 1/1966 | Kraus | 73/19 |
| 3,251,217 | 5/1966 | Evens et al. | 73/19 X |
| 3,293,902 | 12/1966 | Kraus | 73/19 |
| 3,427,863 | 2/1969 | Schultz | 73/19 X |
| 3,498,105 | 3/1970 | Hetherington | 73/19 |
| 3,559,453 | 2/1971 | Aspinal et al. | 73/19 |
| 3,587,638 | 6/1971 | Lambrecht et al. | 277/15 X |

FOREIGN PATENTS OR APPLICATIONS
688,927   10/1966   Belgium ............................ 73/19

Primary Examiner—Richard C. Queisser
Assistant Examiner—Stephen A. Kreitman
Attorney, Agent, or Firm—Burgess, Ryan and Wayne

[57] ABSTRACT

A system for determining the quantity of a gas released from a sample includes a detection circuit having a degassing chamber. A carrier gas flows from a source thereof to the detection circuit and to a reference circuit. The outputs of the reference and detection circuits are connected to comparison cells of a catharometer, and thence to a common measuring circuit. The degassing chamber includes a tubular enclosure, with two end sleeves spaced from the enclosure to define annular gaps. The carrier gas is supplied to the gaps, to establish fluid seals between the sleeves and the enclosure.

2 Claims, 2 Drawing Figures

QUANTITATIVE GAS DETECTION APPARATUS

The present invention relates to an apparatus for determining the quantity of a gas released from a sample.

U.S. Pat. Application Ser. No. 278,560 filed Aug. 7, 1972 describes and claims a method of determining the quantity of gas in a sample and an apparatus for determining the quantity of a gas in a sample. The apparatus described therein comprises: supply means for supporting carrier gas, the supply means including a valve for controlling the rate of flow of carrier gas from the supply means and a leak or vent; a first circuit or reference circuit; a second circuit or detection circuit; and a third circuit, the reference circuit and the detection circuit being connected in parallel between the supply means and the third circuit, the third circuit including a suction pump and a first pressure drop element, the reference circuit including a second pressure drop element and a first cell of a catharometer downstream of the second pressure drop element, the detection circuit including a first opening and closing valve, a degassing chamber downstream of the opening and closing valve, a third pressure drop element downstream of the degassing chamber and a second cell of the catharometer, the degassing chamber being provided with means for heating the sample therein, the degassing chamber also having an entrance for introducing and removing the sample; and a complementary circuit connected to the source of carrier gas and including a second opening and closing valve, a valve for controlling the rate of flow of carrier gas through the complementary circuit, and downstream of the two last mentioned valves, means for forming a gaseous curtain for isolating the degassing chamber from the atmosphere when the entrance of the degassing chamber is open. In operation, carrier gas flows through the detection circuit from the supply means, excess carrier gas escaping through the leak or vent. The sample is heated in the degassing chamber to release a gas or gases present therein and the released gas or gases are swept from the degassing chamber by the carrier gas passing through the detection circuit and pass through the second cell of the catharometer.

The accuracy and precision of measurements carried out on the sample depends to a great extent on the technology used in producing the detection circuit. Uncontrolled introduction into the detection circuit of a gas liable to interfere with the gas the quantity of which is being determined affects the second cell of the catharometer, with the result that an erroneous value of the quantity of gas released by the sample is indicated by the catharometer. There is a tendency of uncontrolled introduction of gas to occur particularly into the degassing chamber. Consequently, it is advisable to ensure the best possible conditions of sealing the degassing chamber from the atmosphere and to maintain these conditions under all circumstances. As certain elements of the degassing chamber are subjected to considerable increases in temperature it is difficult in the present state of the art to maintain these conditions during extended periods of operation. Moreover, it is necessary that the above-mentioned elements should not reach temperatures at which they no longer act inertly in relation to the determination operation carried out. This necessitates dimensioning the degassing chamber in such a way that some of its elements are remote from the heating zone. However, one is still obliged in practice to restrict the heating time because of the heat conduction which occurs.

Direct cooling of the element of the degassing chamber situated in the heating zone is not a satisfactory solution to this problem, since it is necessary to prevent the gases released from the sample from coming into contact with any cooled surface on which there is a danger of their becoming fixed. Moreover, this solution has a certain complexity concerning its application to the case in point.

The present invention aims at improving the reliability of an apparatus for determining the quantity of a gas released from a sample such as that apparatus described in the aforementioned U.S. Pat. Application Ser. No. 278,560 in particular as concerns the sealing of the degassing chamber when the degassing chamber is subjected to extended or repeated heating operations, and also to improve the conditions of sweeping of the said chamber with the carrier gas.

According to the present invention, there is provided an apparatus for determining the quantity of a gas released from a sample, comprising: supply means for supplying a carrier gas and including a leak or vent for allowing carrier gas to escape; a detection circuit including a degassing chamber; a suction pump; the detection circuit being arranged between the supply means and the suction pump, the degassing chamber comprising a tubular enclosure and two sleeves each surrounding a respective end portion of the tubular enclosure and defining an annular gap between the outer lateral surface of the tubular enclosure and the inner lateral surface of the sleeve; means for cooling each sleeve; and two conduits each communicating with the leak or vent and opening into a respective one of said annular gaps so that, when carrier gas is supplied from the leak or vent through the conduits to the annular gaps, the fluid seals are established between the inner lateral surface of each sleeve and the outer lateral surface of the tubular enclosure.

The sealing of the degassing chamber is ensured in the zones of connection of the heating enclosure and of the sleeves, that is to say at the end portions of the heating enclosure, by fluid seals, the excess carrier gas being blown for this purpose into the annular gaps formed respectively between the heated part of the degassing chamber constituted by the tubular enclosure and the cooled part of the chamber. The flow of excess carrier gas is throttled in said gaps, thus preventing any entry of air into the degassing chamber opposite the connection zones. The effectiveness of the sealing effected in this manner is not diminished in any way by the rise and the maintenance of the temperature of the heating enclosure. Any possible entry of carrier gas into the degassing chamber from the fluid seals does not disturb the functioning of the apparatus as the chamber is swept by the same carrier gas at constant rate and atmospheric pressure by putting into effect arrangements identical to those described in the aforementioned U.S. Pat. Application Ser. No. 278,560.

An apparatus embodying the invention is described below with reference to the accompanying drawings, in which.

Figure 1:
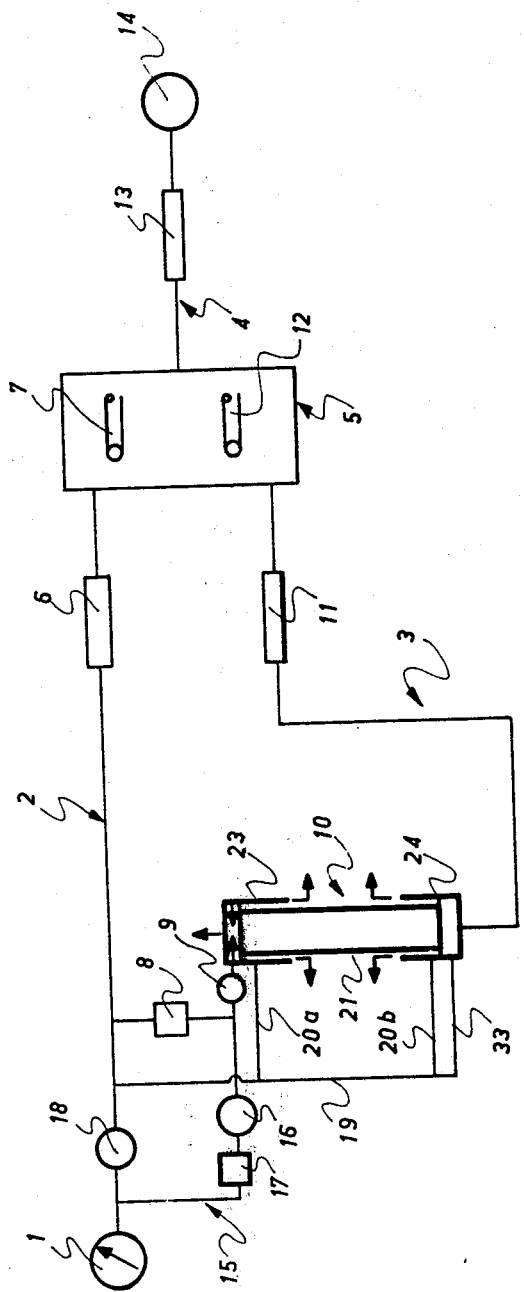
FIG. 1 is a diagram of the apparatus.

The apparatus shown in the drawings is a modification of the apparatus described in the aforementioned U.S. Pat. Application Ser. No. 278,560.

Referring to FIG. 1, the apparatus comprises a reference circuit 2 and a detection circuit 3 connected in parallel to a source 1 of carrier gas. The two circuits 3 and 2 terminate in a common circuit 4 at the outlet of a catharometer 5.

The reference circuit 2 includes a capillary 6 and a first cell 7 of the catharometer 5. The detection circuit 3 includes an electrically operated valve 8, a calibration device 9, a degassing chamber 10, a capillary 11 and a second cell 12 of the catharometer 5. The circuit 4 includes a capillary 13 and a suction pump 14. A complementary circuit 16 includes a regulating tap 16 and an electrically controlled valve 17. The circuit 15 is connected between the source 1 of carrier gas and the detection circuit upstream of the degassing chamber. A flow-regulating tap 18 and an escape channel or conduit 19 to the atmosphere are arranged upstream of the reference circuit 2 and the detection circuit 3. The source 1 of carrier gas, the tap 18 and the escape channel 19 constitute supply means for supplying carrier gas. The escape channel 19 communicates with two conduits 20a, 20b connected to the degassing chamber as described below.

The cell 12 is of conventional type and is sensitive to variations in thermal conductivity of gas flowing therethrough.

Figure 2:
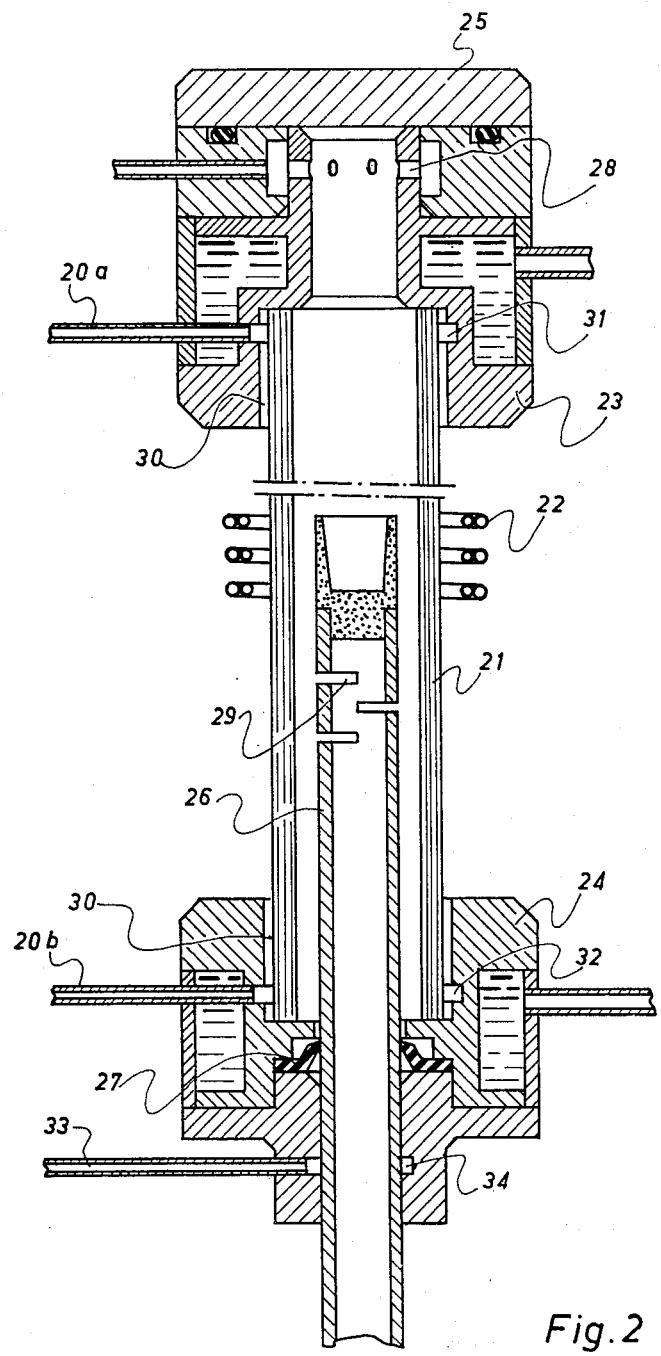
FIG. 2 is a partly sectional view of the degassing chamber of the apparatus.

As shown in FIG. 2, the degassing chamber comprises an upright tubular quartz enclosure 21, and two sleeves, namely an upper sleeve 23 and a lower sleeve 24, both cooled by circulating water. This arrangement is a modification of the degassing chamber disclosed in U.S. Pat. Application Ser. No. 278,208, filed Aug. 7, 1972. The enclosure 21 is surrounded by an inductive winding 22. The two sleeves 23, 24 each surround a respective end portion of the enclosure 21. The degassing chamber has an entrance at its upper end, which entrance can be opened and closed by an obturator member 25. An axially movable tubular support element 26 for supporting the sample is arranged in the degassing chamber. The support element 26 extends to the exterior of the degassing chamber through a sealing joint 27 at the lower end of the degassing chamber. Orifices 28 for the inlet of carrier gas are formed in an inner wall of the upper sleeve 23 and holes 29 for the outlet of carrier gas and a gas or gases released by the sample are provided in the tubular element 26 adjacent its upper end.

The external diameter of the tubular enclosure 21 and the internal diameter of the sleeves 23, 24 are such that an annular space or gap 30 is defined between the inner lateral surface of each sleeve 23 or 24 and the outer lateral surface of the tubular enclosure 21. By "annular space or gap" what is meant is that the clearance between the enclosure and the sleeves is greater than the clearance which would correspond to a sliding fit of the enclosure in the sleeves. In the apparatus shown in the drawings, the external diameter of the tubular enclosure 21 is 40 mm, and the average clearance between the sleeve and the enclosure is 1/10 mm.

The conduits 20a, 20b open into circular channels 31, 32 respectively provided in the inner surfaces of the sleeves 23, 24 and surrounding the end portions of the tubular enclosure 21. The sleeves 23, 24 are connected by a clamping device, not shown, in such a manner as to lock the tubular enclosure 21 in position. A conduit 33 can extend from the leak channel 19 and open into a circular groove or channel 34 formed in the lower sleeve 24 below the sealing joint 27 and surrounding the tubular support element 26.

The principle of operation of the apparatus is substantially identical to that of the apparatus described in the aforementioned U.S. Pat. Application Ser. No. 278,560 and aforementioned U.S. Pat. Application Ser. No. 278,208, to which reference can be made and which in consequence will not form the object of precise description.

The pump 14 sucks through the reference circuit 2 and the detection circuit 3 equal rates of flow of gas, the sum of these rates of flow being kept lower than the rate of flow supplied by the regulating tap 18 associated with the source of carrier gas. Excess carrier gas escapes to the atmosphere through the leak channel 19. The heating of a sample in the degassing chamber 10 releases the gases contained in said sample, some of which can be delayed or trapped in the conventional manner downstream of the degassing chamber. The gas, the quantity of which is to be determined brings about, during its passage in the cell 12 of the catharometer an unbalance of a measurement bridge, on the two arms of which are arranged respectively the reference cell 7 and the detection cell 12. In the course of periods of opening the degassing chamber for the introduction or extraction of a sample the valve 8 is closed and the valve 17 is simultaneously opened, which makes it possible to form at the level of the orifices 28 a protective curtain of carrier gas isolating the chamber from the atmosphere, the corresponding rate of flow of gas being fixed by the regulating tap 16 at a valve greater than the rate sucked into the degassing chamber.

The excess carrier gas is blown into the annular spaces 30 in which it is divided out by the circular channels 31, 32 and consequently escapes to the atmosphere opposite connection zones of the enclosure 21 and the sleeves 23, 24 thus forming, by "throttling" the blown gas, fluid seals ensuring sealing of the degassing chamber against the atmosphere in the connection zones. Any entry of carrier gas into the degassing chamber from the fluid seals does not disturb the measurement effected since this gas is the same as the gas sweeping the degassing chamber. The width of the gaps between the sleeves 23, 24 and the enclosure 21 is a compromise taking into account on the one hand the fact that too small a clearance gives rise to pressure drops which it is advisable to restrict so that the leak (constituted by the escape channel 19) can fulfill its role, on the other hand by the fact that a clearance that is too large brings with it increased consumption of carrier gas and can give rise to disturbances in the flow of the carrier gas in the annular gap. This latter consideration is bound up with the very conception of fluid seals in general. The carrier gas blown in through the supplementary conduit 33 suffers a considerable pressure drop and serves solely to complete the sealing ensured by the seal 27, the corresponding rate of flow of carrier gas being relatively small in relation to the total rate of flow of the leak to the atmosphere.

While providing the advantages of the apparatus described in the aforementioned U.S. Pat. Application Ser. No. 278,560, the apparatus shown in the drawings of the present application makes it possible furthermore to undertake repeated or extended determinations under conditions of total reproducibility. In actual fact, the fluid seals fulfill their function of sealing against the atmosphere whatever may be the temperature and the duration of the period during which the temperature is maintained of the enclosure in which the samples are heated, with the result that any uncontrolled entry of a disturbing gas into the degassing chamber is excluded. Since the fluid ensuring the sealing is the carrier gas itself there is no disadvantage if traces of this gas penetrate into the degassing chamber, such introduction being without effect on the measurements carried out.

The operation in temperature of the fluid seals makes it possible moreover to use a heating enclosure of reduced longitudinal dimensions which allows more rapid sweeping of the gases released by the samples and lessening of the effects of dilution in the carrier gas. Finally, it is noted that the improvements forming the subject of the present invention can be carried out very easily and moreover provide advantages in the measurement of a gas.

What is claimed is:

1. Apparatus for determining the quantity of gas in a sample comprising
    a supply means for supplying a carrier gas under greater than atmospheric pressure,
    a melting furnace comprising a tubular chamber of angular cross-section,
    a vent in said chamber,
    conduit means for connecting the supply means to the tubular chamber whereby said carrier gas sweeps through said chamber,
    a separate sleeve surrounding each end of the chamber, each sleeve having an open end and a capped end, the capped end of each sleeve forming a seal with the respective end of the chamber, each sleeve being provided with an annular channel proximate the capped end thereof and communicating with an external wall of said chamber, the external walls of said chamber and the internal walls of said sleeves defining tubular passages open to the atmosphere and having annular cross-sections, said tubular passages communicating with said channels, and means for connecting the vent from the chamber to said annular channels whereby the gas pressure proximate each end of the chamber is increased by the carrier gas vented from the chamber thereby forming a gas seal at each end of the chamber.

2. The apparatus of claim 1 wherein said annular gap has an average clearance of substantially 1/10 millimeter.

* * * * *